United States Patent [19]
McArdle et al.

[11] Patent Number: 5,411,998
[45] Date of Patent: May 2, 1995

[54] CURING ANAEROBIC COMPOSITIONS THROUGH THICK BONDLINES

[75] Inventors: Ciaran B. McArdle; Joseph Burke, both of Dublin, Ireland

[73] Assignee: Loctite Limited, Dublin, Ireland

[21] Appl. No.: 93,414

[22] Filed: Jul. 19, 1993

[30] Foreign Application Priority Data

Jul. 24, 1992 [IE] Ireland .................................. 922418

[51] Int. Cl.$^6$ ............................ C09J 4/02; C09J 5/02; C08F 4/00
[52] U.S. Cl. .................................. 523/176; 526/179; 526/205; 526/230; 526/232; 526/236; 526/319; 526/320; 156/307.3; 156/327
[58] Field of Search ................ 523/176; 526/204, 205, 526/137, 145, 147, 230, 232, 319, 320, 915, 179, 236, 193; 524/287; 156/307.3, 327

[56] References Cited

U.S. PATENT DOCUMENTS

| | | | |
|---|---|---|---|
| 4,215,209 | 7/1980 | Ray-Chaudhuri et al. | 526/320 |
| 4,287,330 | 9/1981 | Rich | 523/176 |
| 4,500,629 | 2/1985 | Irving et al. | 523/176 |
| 4,764,239 | 8/1988 | Jacobine et al. | 156/307.3 |
| 4,812,495 | 3/1989 | Sand | 524/37 |

FOREIGN PATENT DOCUMENTS

| | | |
|---|---|---|
| 3525695 | 1/1986 | Germany . |
| 0120889 | 11/1974 | Japan . |
| 2184076 | 8/1987 | Japan . |
| 2228943 | 9/1990 | United Kingdom . |
| WO87/00536 | 1/1987 | WIPO . |

OTHER PUBLICATIONS

"Advanced Organic Chemistry", 3rd edition, by March J. John Wiley & Sons, p. 228, New York.

*Primary Examiner*—Paul R. Michl
*Assistant Examiner*—Tae H. Yoon
*Attorney, Agent, or Firm*—Edward K. Welch, II; Eugene F. Miller

[57] ABSTRACT

A process for sealing or adhering two surfaces having gaps of more than 100 micrometers between the surfaces which comprises:

(A) applying to at least one of said surfaces an anaerobic composition comprising:
 (i) a room temperature polymerizable (meth)acrylic monomer,
 (ii) a peroxy free radical initiator, and
 (iii) an amount effective as an accelerator of a combination of saccharin and at least one onium salt (other than an iodide); and (B) placing said surfaces in an abutting relationship until the composition has cured through the gaps.

Exemplified onium salts are phosphonium salts of the formula IV and quaternary ammonium salts of the formula II:

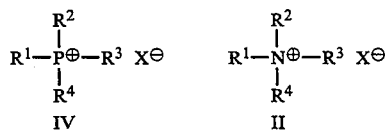

wherein $R^1$, $R^2$, $R^3$ and $R^4$ which may be the same or different, are hydrocarbyl, hydrocarbylaryl, aryl or a substituted derivative thereof;

X is Cl, Br or F, or a soft anion.

23 Claims, No Drawings

CURING ANAEROBIC COMPOSITIONS THROUGH THICK BONDLINES

BACKGROUND OF THE INVENTION a) Field of the Invention

This invention relates to a method of curing anaerobic compositions through thick bondlines, and to compositions for use in the method. The invention is particularly concerned with anaerobic adhesives which are used in engineering applications such as gasketting, retaining, sealing and thread-locking.

b) Description of the Related Art

Redox initiated room temperature bulk polymerisation of monomeric and telechelic type (meth)acrylates is generally triggered by metallic species inherent on machinery parts. The "cure engine" which supplies a radical flux on demand may comprise a hydroperoxide together with common accelerators. (STAMPER, D. J., Curing characteristics of anaerobic sealants and adhesives. Brit. Polym. J., 15 (1983) 34–9).

The decomposition of hydroperoxide in the presence of amine is well known to be catalysed by transition metals, particularly cupric or ferrous species for example. The appropriate metallic species are provided by substrate surfaces or alternatively, by specific activating treatment when substrates lack activity. An overview of anaerobic adhesives has been recently published by Boeder. (BOEDER, C. W., "Anaerobic and Structural Acrylic Adhesives" in "Structural Adhesives - Chemistry and Technology", ed. S. R. Hartshorn, Plenum Press, New York 1986, p.217).

Surface initiated redox polymerisation is reasonably efficient and products may be developed with a range of characteristics tailored to meet end user requirements. Specific requirements might, for example, relate to cure speed or fixture time as such parameters may be of extreme importance in on-line manufacturing processes which involve bonding stages. Cure speed will, to a degree, correlate with extent of cure through a given bondline thickness. Thus, cure through gap or cure through volume (CTV), is a further feature of anaerobic adhesives which may require characterisation.

In the majority of their end usage, anaerobic adhesives are employed in so-called "zero gap" situations, i.e. when substrates to be bonded are in intimate contact (in reality zero gap corresponds to some 5–15 $\mu$m). Under such circumstances bonded assemblies will have high strength and performance as a consequence of an essentially homogeneous cure initiated from both sides of a thin (c. 10 $\mu$m) bondline. In specialised applications, however, the substrates to be bonded may, by intention or otherwise, have non-uniform surface profiles and excursions of several hundred micrometers may be present between them. In such circumstances, bulk adhesive in the centre of a thick bondline (hundreds of micrometers) is distanced from the surface source of catalytic metallic species. Furthermore, the adhesive layers closest to the substrate surface will already be experiencing cure so that the prospect for metal ion diffusion into the bulk is reduced due to the physical barrier to transport established by crosslinked polymer network formation at the substrate-adhesive interface. The heterogeneous cure in this latter case will lead to joints with performance and strengths dependent upon the relative fractional area between substrates which is set at large gap when conventional anaerobic adhesives are employed. (McArdle et. al., Plastics, Rubber and Composites Processing and Applications 16 (1991) 245–253).

Otsu et. al. (j. Polym. Sci (A-1) Z, 3329, 1969) teach that Dimethyl benzyl aniline chloride (DMBAC), a quaternary ammonium salt, is an efficient component of a redox couple for radical initiation of acrylic polymerisations in solvent. This salt is apparently more efficient in this regard than its parent amine, N,N-dimethyl aniline. However Otsu et. al. do not provide any teaching about anaerobic compositions which use saccharin as an accelerator. Further reference has been made to the participation of quaternary ammonium salt in vinyl polymerisation in solution by Ghosh et al. (Eur. Polymer J, 14, 855, 1978) and Rasmussen et. al. (Makromol. Chem., 182, 701, 1981). In the former study in both dilute and concentrated solution, mechanisms have been proposed wherein cetyl trimethyl ammonium bromide interacts with benzoyl peroxide to produce radicals capable of initiating polymerisations. In the latter study the quaternary (quat) salt was merely used as an agent to solubilise other well known initiators, e.g. peroxydisulphate. Still further studies in emulsion systems teach the participation of quat salts in bulk polymerisation of methyl methacrylate (Polym. Bull., 21, 151, 1989). The trioctyl methyl ammonium salts [(TOMAX) where X=anion] that were used were sufficiently soluble in the bulk state and again a mechanism has been proposed. That quat salts are active in the decomposition of hydroperoxides as well as peroxides is further emphasised by the study of Napadensty et. al. (J. Chem. Soc. Chem. Commun. 65, 1991) in which the catalytic effect of the quat salt in the decomposition of tetralin hydroperoxide has been studied. In this study, the catalytic activity of the quat salt decreases as the anion is changed from chloride through bromide to iodide.

Czechoslovak Patents CS 169915-B and CS 169916-B (1977) describe anaerobic compositions which contain certain quaternary ammonium salts formed between heterocyclic bases and (meth)acrylic acid. However these compositions do not contain saccharin as an accelerator.

Quaternary salts have not been previously employed as part of a cure system for the purpose of enhancing cure through thick bondlines. Whilst very active anaerobic formulations can be made with traditional anaerobic accelerators, e.g. those of Table 4 on page 227–8 of the book "Structural Adhesives - Chemistry and Technology" edited by S. R. Hartshorn published by Plenum Press (1986), these do not demonstrate good cure through volume (CTV). If a cure system is adjusted, CTV may be achieved but at the expense of stability of the formulation so that its commercial value is worthless.

SUMMARY OF THE INVENTION

The present invention is based upon the discovery that saccharin and onium salts (other than iodides) form an advantageous and synergistic accelerator combination for achieving good CTV. Although this invention is not limited by any theory, it is believed that the saccharin, being acidic in nature, forms a salt or complex with the onium salt, possibly with anion exchange.

The present invention provides a process for sealing or adhering two surfaces having gaps of more than 100 micrometers between the surfaces which comprises:

(A) applying to at least one of said surfaces an anaerobic composition comprising:
  (i) a room temperature polymerizable (meth)acrylic monomer,
  (ii) a peroxy free radical initiator, and
  (iii) an amount effective as an accelerator of a combination of saccharin and at least one onium salt (other than an iodide); and
(B) placing said surfaces in an abutting relationship until the composition has cured through the gaps.

According to one aspect, the present invention provides an anaerobic adhesive and sealant composition comprising:
  (i) a room temperature polymerizable (meth)acrylic monomer,
  (ii) a peroxy free radical initiator, and
  (iii) an amount effective as an accelerator of a combination of saccharin and at least one onium salt (other than an iodide).

In a preferred embodiment, the onium salt is a phosphonium salt, most preferably a phosphonium salt of the formula IV

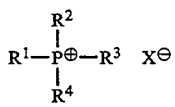

wherein $R^1$, $R^2$, $R^3$ and $R^4$ which may be the same or different, are hydrocarbyl, hydrocarbylaryl, aryl or a substituted derivative thereof;

X is Cl, Br or F or a soft anion, such as $-SbF_6$, $-BF_4$ or $-PF_6$.

Phosphonium salts have been found to be particularly advantageous in combining high CTV performance with good stability and good speed of cure.

In one preferred phosphonium salt of formula IV, $R^1$ is: $R^9-(S)_n-(CH_2)_m-$ in which $R^9$ is phenyl or substituted phenyl, or $C_1-C_5$ alkyl or alkenyl, n is 0 or 1 and m is 0 or 1.

Preferably $R^2$, $R^3$ and $R^4$ are each phenyl or $C_1-C_5$ alkyl.

In another embodiment, the onium salt is a quaternary ammonium salt, more particularly an ammonium salt of the formula II

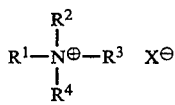

wherein $R^1$, $R^2$, $R^3$, $R^4$ and X are as defined above. Preferred ammonium salts are those of formula III

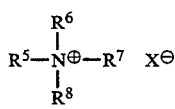

wherein $R^5$, $R^6$, and $R^7$ which may be the same or different, are alkyl having at least 8 carbon atoms; $R^8$ is alkyl having 1–5 carbon atoms; and X is as defined above. Most preferred ammonium salts are liquid phase transfer agents such as are sold by Aldrich Chemical Company under the Trade Marks Aliquat 336 and Adogen 464 of Henkel KgAA.

In one embodiment of the invention, mixtures of onium salts may preferably be employed. Such mixtures may suitably comprise mixtures of ammonium salts of formula III as defined above with one or more other ammonium salts of formula II as defined above; or mixtures of phosphonium salts of formula IV above with one or more ammonium salts of formula III as defined above or one or more other ammonium salts of formula II as defined above.

In a significant preferred feature, the anaerobic composition may be free of polymerisable acids such as (meth)acrylic acid. Instead the composition may contain a non-polymerisable organic acid such as a weak carboxylic acid such as benzoic acid.

The onium salt, particularly a phosphonium salt, may suitably be present in an amount of about 0.25 to about 1.5%, preferably about 0.5 to about 1% by weight of the composition.

If a mixture of onium salts is used, the mixture may suitably be present in an amount up to about 2%, preferably about 1 to about 1.5%, by weight of the composition.

Saccharin is present in the composition in an amount about 0.3 to about 5%, preferably about 0.3 to about 1%, most preferably about 0.5 to about 0.7% by weight of the composition.

The term "hydrocarbyl" as used herein means straight chain or branched chain linear or alicylic aliphatic hydrocarbyl including alkyl, alkenyl and alkynyl. Hydrocarbyl groups shall preferably contain from 1 to 10 carbon atoms, more preferably from 1 to 5 carbon atoms, and aryl and hydrocarbylaryl groups shall preferably have from 6 to 20 carbon atoms, more preferably from 6 to 10 carbon atoms. The aryl group may have a fused ring structure. A substituted derivative of the foregoing may suitably be substituted with one or more halo, or nitro or phosphonium groups (which may in turn may be of the formula IV) or substituted or interrupted by one or more heteroatomic keto or ether groups wherein the hetero atom is O, S or N, more particularly $-O-$, $=O$, $-S-$, $=S$ or $\equiv N$. Halogen may be chlorine, bromine or fluorine.

The term "soft anion" as used herein means an anion derivative of a soft acid. In soft acids the acceptor atoms are large, have low positive charge and contain unshared pairs of electrons ($\underline{p}$ or $\underline{d}$) in their valence shells. They have low polarizability and high electronegativity (see March J., Advanced Organic Chemistry, 3rd Edition, John Wiley & Sons, New York; p228).

The (meth)acrylic monomer may be any of the monomeric or telechelic (meth)acrylates known in the field of anaerobic adhesive and sealant compositions, for example as described in U.S. Pat. No. 4,018,851 Baccei; U.S. Pat. No. 4,295,909 Baccei; U.S. Pat. No. 4,287,330 Rich; or Boeder, loc cit, pages 219–224. Typical of the monomers are urethane-acrylate - capped prepolymers.

The peroxy free radical initiator may also be any of those known in the field of anaerobic compositions, for example as described in U.S. Pat. No. 4,287,330 Rich or in Boeder, loc cit, page 224. A particularly useful class of peroxy initiators are the organic hydroperoxides such as cumene hydroperoxide, methylethyl ketone hydroperoxide or tert. butyl hydroperoxide. The initiator should be used in an amount sufficient to initiate polymerization of the monomer, for example about 0.01 - about 10%, preferably about 0.1 to about 5%, by weight of the composition.

The composition may be prepared, if desired, with reactive diluents which are capable of copolymerizing with the monomers. Typical of such diluents are the hydroxyalkyl acrylates such as hydroxypropyl acrylate, hydroxyethyl acrylate and the corresponding methacrylate compounds. When used, the concentration of such diluents should be less than 60%, preferably 40 to 10%, by weight of the composition.

The balance of the composition comprises the monomer together with other additives known to the art which may be employed as needed and at concentrations known in the art. One or more stabilisers including polymerization inhibitors such as those of the quinone or hydroquinone type and/or chelating agents may suitably be used. Inhibitors are used in an amount sufficient to prevent premature polymerization of the composition.

A primer of a kind known in the art may be used on one or both surfaces, if desired. A copper based primer is preferred, and it may advantageously be mixed with an accelerator of known type e.g. acetyl phenyl hydrazine.

DESCRIPTION OF THE PREFERRED EMBODIMENTS

The invention is illustrated in the following Examples.

EXAMPLE 1 (Methodology)

TABLE 1

Model Anaerobic Formulation

| Component | Composition w/w % |
|---|---|
| 1. Hydroxypropyl Methacrylate | 10.2 |
| 2. Acrylic Acid | 10.0 |
| 3. Stabiliser 1[a] | 0.2 |
| 4. Stabiliser 2[b] | 1.0 |
| 5. Saccharin | 0.6 |
| 6. Additive (to be specified) | 1.0 |
| 7. Resin Base (to be specified) | 75.0 |
| 8. Cumene Hydroperoxide | 2.0 |
| Total: | 100.0 |

[a] typical radical inhibitor, e.g. hydroquinone cf. Boeder cited above.
[b] typical metal chelator, of the ethylene diamine tetramine type cf. Boeder cited above.

A model anaerobic composition was made up according to the components specified in Table 1 by mixing together at room temperature using the procedures well known to those skilled in formulation art. The formulation was allowed to stand overnight in an open polyethylene beaker to permit dissolved air to rise to the surface following the rigorous mixing processes.

Formulations were tested on Grit Blasted Mild Steel (GBMS) lapshears primed with a commercially available copper containing activator (known as Activator N, Loctite Corporation), unless otherwise stated. Test procedures for tensile shear of bonded specimens followed those laid out by ASTM or DIN standards D100-64 and 53283 respectively. Results were recorded on a minimum of ten repeats per sample at each of two bondline thicknesses referred to as zero gap (effectively mating parts) and 0.5 mm gap set by a high quality Nichrome "horse shoe" spacer in the bondline. The latter methodology simulates a thick bondline that, for example, might be experienced with very poorly machined parts. Bonded joints were always tested 24 hours after assembly.

EXAMPLE 2 (Comparative)

Model formulation as per Table 1 was prepared wherein additive 6 was acetylphenyl hydrazine (cf. Table 4, p228 of Boeder cited above; also Rich U.S. Pat. No. 4,287,330). Resin component 7, was a difunctional urethane methacrylate and was "blocky" in nature similar to those described by Baccei U.S. Pat. No. 4,309,526 and U.S. Pat. No. 3,425,988. This formulation was deemed stable since it did not gel after a sample was held at a constant 82° C. for 180 minutes (so called "82° C. stability test" - a result greater or equal to 60 minutes indicates that a formulation is very stable, whilst gelation after 10 minutes indicates that it is very unstable). When tested as per procedure defined in Example 1, the data given by the first entry of Table 2 resulted. Fixture time, defined as the minimum time required for the bonded substrates to fully support a suspended 3 kg. mass from one substrate whilst the other is clamped vertically, was typically 20-30 seconds. Stability is excellent, fixture rapid but CTV is disappointing since only approximately ⅓th of the initial zero gap strength is retained at the 0.5 mm gap.

EXAMPLE 3

A quaternary salt of structure I was prepared by the method of Otsu et al cited above:

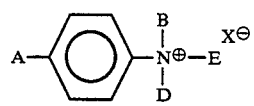

where A=—H, B=—CH₃ =D, and E=—CH₂—C₆H₅ with X=Cl (N,N-Dimethyl N-benzyl aniline chloride). This material was used as additive 6 in a formulation as per Table 1 and tested according to Examples 1 and 2. Test results are given at entry 3(a) in Table 2. CTV is very good and fixture acceptably fast, although 82° C. stability is low.

A similar formulation was made up but omitting saccharin. Test results are given at entry 3(b) in Table 2. CTV is poor.

EXAMPLE 4

This uses salt of structure I wherein A=CH₃=B=D, and E=—CH₂—C₆H₅ with X=Cl (N,N-Dimethyl N-benzyl para-toluidine chloride) and is formulated as per Table 1 and tested as per Examples 1 and 2. Test results are shown in Table 2. Again CTV is high although stability low.

EXAMPLE 5

This uses salt of structure I wherein A=—CH₃=B=D, and E=—CH₂—C₆H₅ with X=SbF₆⁻ (N,N-Dimethyl N-benzyl para-toluidine hexafluoroantimonate) prepared by anion methathesis of the salt used in Example 4. Test results are shown in Table 2.

EXAMPLE 6 (Comparative)

This uses salt of structure I wherein A=B=-D=E=—CH₃ and X=I (N,N,N-Trimethyl para-toluidine iodide), prepared by treating N, N-dimethyl para-toluidine with excess methyl iodide with stirring under reflux in ethanol. Test results are shown in Table 2. The quat iodide overstabilises the formulation and prevents CTV altogether and virtually inhibits zero gap cure. (cf. Napadensty et al lot. cit).

EXAMPLE 7

A model formulation was prepared as per Table 1 and tested as per Examples 1 and 2. This uses the liquid ion exchange resin known under the Trade Mark Aliquat 336 (commercially available through Aldrich Chemical Co.) as additive 6. Aliquat 336 has structure approximately defined by IIIa according to commercial literature:

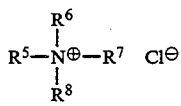

where $R^5=R^6=R^7=$ mixture of $C_8$ and $C_{10}$ chains with $C_8$ predominating, and $R^8=CH_3$.

This was analysed in house for Cu and Fe content. No detectable Fe was found and Cu analysis was 0.16 ppm which was well below accepted contaminant standards. Test results are shown at entry 7(a) in Table 2. Now stability is good, CTV exceptional but fixture is slow.

A similar formulation was made up but omitting saccharin. Test results are given at entry 7(b) in Table 2. CTV is inferior to that of formulation 7(a).

EXAMPLE 8

Two model formulations were made up as per Table 1. These were 8(a) and 8(b). A difunctional methacrylated urethane of much more rigid structure than that used in the preceding Examples formed component 7 of the formulation, this had a much lower viscosity than the previous resin also. Formulation 8(a) and 8(b) use additive 6 components identical to those defined in Examples 2 and 7 respectively. Test results are shown in Table 2. The stability of 8(a) was greater than 8(b). Fixture is slow for 8(b) relative to 8(a).

EXAMPLE 9

A model formulation was prepared according to Table 1 and tested as defined in Examples 1 and 2. In this case, additive 6 was a liquid ion exchange resin known under the Trade Mark Adogen 464 (commercially available through Aldrich Chemical Co.) which has formula IIIb

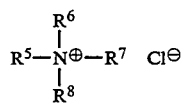

where $R^5=R^6=R^7=$ mixture of undefined $C_8-C_{10}$ chains and $R^8=CH_3$.

Test results are shown in Table 2.

EXAMPLE 10

The beneficial CTV effects demonstrated above by Aliquat 336 formulations were seen to depend on both the concentration of component 6 (Table 1) and the level of stabiliser 2. Thus entries 10a and 10b of Table 2 describe samples tested as per Examples 1 and 2 but containing double and one half the quantity respectively of Aliquat 336. Comparison with Example 7 serves to indicate how the improved CTV effect can be optimised. The sample containing one half of the standard level of Aliquat 336 was however stable at 82° C. for 100 minutes.

The standard formulation (Table 1) using the specified level of Aliquat 336 was modified with respect to stabiliser 2 level. Thus: 10(c) contains double stabiliser 2 level, 10(d) contains five times the stabiliser 2 level (cf. Table 1). Test results are shown in Table 2. Stability increases and excellent CTV is retained while fixture times are not further adversely affected.

Still further, it was found that modification of Acrylic acid level, component 2 of Table 1 in Example 7 type formulations, gave stability increases. Thus, formulations as per Example 7 but containing 0% (10(e)), 2.54 (10(f)) and 5% (10(g)) of acrylic acid in place of the 10% standard (Table 1) had the test results shown in Table 2 i.e. good stability with retained CTV performance.

A still further dependency in this type of formulation containing Aliquat 336 relates to the presence of component 5 (Saccharin). Thus, if this is replaced by an alternative acid species such as Maleic acid at equivalent concentration, then both stability at 82° C. (now 30 minutes) and CTV performance fall as shown by the results in Table 2 (10(h)).

EXAMPLE 11

Whilst satisfactory 82° stability in addition to high CTV performance can be achieved as evidenced in some of the foregoing examples, a highly desirable feature is fast fixture, cf. Example 7. However, if a model formulation is prepared according to Table 1 using Aliquat 336 as additive 6 and further adding 0.334 of quaternary salt of structure I where $A=CH_3=B=D$ and $E=CH_2-C_6H_5$ and $X=Cl$, good stability, fast fixture as well as high CTV result. Data are given in Table 2.

TABLE 2

Performance of various formulations tested as per Example 1:

| Example | 82° C. Stability (Minutes) | Fixture Time (Minutes) | Zero Gap dN/cm$^{-2}$ | 0.5 mm Gap dN/cm$^{-2}$ |
|---|---|---|---|---|
| 2 | >180 | 1/3–1/2 | 244 | 31 |
| 3(a) | 30 | 5 | 233 | 135 |
| 3(b) | 70 | 12 | 154 | 24 |
| 4 | 20 | 5 | 242 | 107 |
| 5 | 75 | 5 | 179 | 103 |
| 6 | 120 | slow | 8 | 0 |
| 7(a) | 70 | 60 | 282 | 200 |
| 7(b) | >80 | slow | 245 | 107 |
| 8(a) | >50 | | 117 | 23 |
| 8(b) | 50 | slow | 225 | 122 |
| 9 | 40 | slow | 227 | 132 |
| 10(a) | ~60 | slow | 159 | 47 |
| 10(b) | 100 | slow | 222 | 73 |
| 10(c) | 130 | slow | 276 | 189 |
| 10(d) | 150 | slow | 243 | 108 |
| 10(e) | 110 | slow | 217 | 179 |
| 10(f) | 95 | slow | 280 | 149 |
| 10(g) | 90 | slow | 228 | 154 |
| 10(h) | 30 | not measured | 190 | 10 |
| 11 | 75 | 11 | 267 | 148 |
| 13(a) | >60 | not measured | 268 | 161 |
| 13(b) | not measured | not measured | 182 | 58 |
| 13(c) | not measured | not measured | 103 | 81 |
| 13(d) | not measured | not measured | 153 | 37 |
| 13(e) | not measured | not measured | 44 | 0 |
| 13(f) | not measured | not measured | 106 | 0 |

EXAMPLE 12

The formulation of Aliquat 336 together with other common accelerators known to confer fast cure such as that used in Example 2, do not furnish a stable formulation. However, if a priming solution is prepared based on a commercially available copper based primer known as activator N which now contains acetylphenylhydrazine at a 0.5–1.0% level and this is used to treat substrates, then the standard model formulation (cf. Example 7) retains high CTV and equivalent 82° C. stability, but now fixes in 20 seconds.

EXAMPLE 13

Stabilisers 1 and 2 are as in Table 1; stabiliser 3 is an acidic stabiliser.

TABLE 3

| Component | Approximate percent by Weight |
|---|---|
| 1. Hydroxy ethyl methacrylate | 10.2 |
| 2. Stabiliser 1 | 0.0075 |
| 3. Stabiliser 2 | 0.15 |
| 4. Stabiliser 3 | 0.15 |
| 5. Resin | 85.0 |
| 6. Additive | 1.0 |
| 7. Saccharin | 0.5 |
| 8. Acrylic Acid | 2.45 |
| 9. Cumene Hydroperoxide | 1.0 |

A second model formulation was prepared according to Table 3 above. Principally, this formulation is richer in resin content than before whilst other changes are largely insignificant. Using the resin from Example 2 together with Aliquat 336 as additive 6, gives excellent CTV as evidenced by entry 13(a) of Table 2. However, entries 13(b)–13(f) inclusive of Table 2 indicate that in a formulation according to Table 3 which employs the same resin but uses the tetraethyl ammonium salts with the following anions: (b) p-toluene sulphonate, (c) acetate, (d) tetrafluro borate, (e) iodide and (f) fluoride, respectively as component 6, the CTV performance is poor or non existent. These results did not justify the measurement of stability or fixture times. The tetra alkyl ammonium chloride Aliquat 336 is thus unusual in its ability to confer CTV.

EXAMPLE 14

Whilst stable high CTV formulations can be made in the ways thus far disclosed, it is further advantageous to retain fast fixture in addition to good stability with high gap curing capability. The first case in Example 11 achieves an eleven minute fixture time by testing according to the defined procedure of Example 2. It would be a further advantage to the end user if this fixture time was still shorter. Whilst the second approach in Example 12 can achieve rapid fixture, a disadvantage is that the thus described primer is itself unstable after a few days aging so that it must be freshly prepared before use to ensure high CTV performance from a formulation using Aliquat 336 or the like.

To address this problem, additive 6 in formulations described by Table 3 was changed from quaternary ammonium salts to quaternary phosphonium salts of general structure IV.

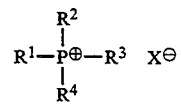

IV

The various materials tested are summarised below:

| | $R_1$ | $R_2$ | $R_3$ | $R_4$ | X |
|---|---|---|---|---|---|
| 14 (a) | $CH_3SCH_2-$ | Ph | Ph | Ph | Cl |
| 14 (b) | $CH_2=CHCH_2-$ | Ph | Ph | Ph | Br |
| 14 (c) | $o-NO_2-C_6H_4CH_2-$ | Ph | Ph | Ph | Br |
| 14 (d) | $C_6H_5-S-CH_2-$ | Ph | Ph | Ph | Cl |
| 14 (e) | $p-MeOC_6H_4CH_2-$ | Ph | Ph | Ph | Cl |
| 14 (f) | $(Br^-)Ph_3P^+(CH_2)_5-$ | Ph | Ph | Ph | Br |
| 14 (g) | $CH_3(CH_2)_{15}-$ | Ph | Ph | Ph | Br |
| 14 (h) | $CH_3(CH_2)_3-$ | Ph | Ph | Ph | Br |
| 14 (i) | $CH_3-$ | Ph | Ph | Ph | I |
| 14 (j) | $C_6H_5CH_2-$ | Ph | Ph | Ph | Cl |
| 14 (k) | $NCCH_2-$ | Ph | Ph | Ph | Cl |
| 14 (l) | (dithiane structure) l | Ph | Ph | Ph | Cl |
| 14 (m) | (fluorenyl structure) m | Ph | Ph | Ph | Br |
| 14 (n) | $Br-CH_2C_6H_4-CH_2-$ | Ph | Ph | Ph | Br |
| 14 (o) | $(Br^-)Ph_3P^+-CH=CH-$ | Ph | Ph | Ph | Br |
| 14 (p) | $F-C_6H_4-CH_2-$ | Ph | Ph | Ph | Cl |
| 14 (q) | $CH_2=CH-$ | Ph | Ph | Ph | Br |
| 14 (r) | $CH_2=CH-CH_2-$ | Ph | Ph | Ph | Cl |
| 14 (s) | Ph | Ph | Ph | Ph | Br |
| 14 (t) | Ph | Ph | Ph | Ph | Cl |
| 14 (u) | Me | Me | Me | Me | Br |
| 14 (v) | Me | Me | Me | Me | Cl |
| 14 (w) | Et | Et | Et | Et | Br |
| 14 (x) | Et | Et | Et | Et | Cl |

Ph = phenyl; Me = methyl; Et = ethyl

The results regarding stability at 82° C., cure through volume and fixture times are summarised in Table 4.

TABLE 4

Performance of Anaerobic Formulations prepared according to Table and tested as per Example 1.

| | Additive 6 | 82° C. Stability (Minutes) | Fixture Time (s) | Strength at: Zero Gap $dN/cm^{-2}$ | Strength at: 0.5 mm Gap $dN/cm^{-2}$ |
|---|---|---|---|---|---|
| 1. | 14(a) | 130–160 | 40 | 142 | 183 |
| 2. | 14(b) | >160 | 45 | 164 | 137 |
| 3. | 14(c) | >160 | 60 | 202 | 89 |
| 4. | 14(d) | >160 | 45 | 159 | 159 |
| 5. | 14(e) | 160 | 40 | 122 | 147 |
| 6. | 14(f) | 160 | 105 | 151 | 134 |
| 7. | 14(g) | 160 | 70 | 133 | 110 |
| 8. | 14(h) | 130 | 70 | 149 | 123 |
| 9. | 14(i) | — | — | 55 | 0 |
| 10. | 14(j) | — | — | 159 | 158 |
| 11. | 14(k) | <45 | 20 | 154 | 195 |
| 12. | 14(l) | <30 | 20 | 113 | 88 |
| 13. | 14(m) | 150–180 | 30 | 127 | 12 |
| 14. | 14(n) | 60–80 | 50 | 161 | 41 |
| 15. | 14(o) | <30 | 30 | 151 | 140 |
| 16. | 14(p) | 90–100 | 30 | 133 | 158 |
| 17. | 14(q) | >100 | 45 | 147 | 120 |
| 18. | 14(r) | 150–180 | 20 | 138 | 151 |
| 19. | 14(s) | >120 | 270 | 249 | 200 |

TABLE 4-continued

Performance of Anaerobic Formulations prepared according to Table and tested as per Example 1.

| Additive 6 | 82° C. Stability (Minutes) | Fixture Time (s) | Strength at: Zero Gap dN/cm$^{-2}$ | 0.5 mm Gap dN/cm$^{-2}$ |
|---|---|---|---|---|
| 20. 14(t) | 110 | 90 | 261 | 219 |
| 21. 14(u) | 110 | 225 | 179 | 145 |
| 22. 14(v) | 60 | 165 | 259 | 183 |
| 23. 14(w) | 119 | 240 | 178 | 154 |
| 24. 14(x) | 30 | 60 | 174 | 186 |

It can be seen from Table 4 that formulation with selected phosphonium salts allows for rapid fixture, high stability and in some cases greater or equal to 100% retention of initial zero gap bond strengths at 0.5 mm gap (cf. entries 1, 4, 5, 11, 16 and 18 in Table 4). The effect of an iodide anion, is again, detrimental to performance as seen by data from entry 9 in Table 4.

EXAMPLE 15

Following Table 3 of Example 13 but using phosphonium salt (d) from Example 14 as Additive 6, , three further formulations were made with changes to the saccharin level, thus:

Formulation (A) contains 0% Saccharin
Formulation (B) contains 0.25% Saccharin
Formulation (C) contains 1.00% Saccharin The performance data of these formulations is summarised below and may be compared with entry 4 of Table 4.

| Formulation | 82° C. Stability (Minutes) | Fixture Time (Seconds) | Bond Strength Zero Gap dN/cm$^{-2}$ | 0.5 mm Gap dN/cm$^{-2}$ |
|---|---|---|---|---|
| A | 135 | 360 | 248 | 30 |
| B | 110 | 210 | 184 | 191 |
| C | 110 | 75 | 241 | 197 |

It can be seen that the beneficial effects to cure through volume are lost when saccharin is absent in the formulation (cf. Example 10 (hi in Table 2).

EXAMPLE 16

It was noted earlier that a mixture of 1% Aliquat 336 with 0.33% of a second quaternary salt defined in Example 11 exhibited retained CTV but with improved fixture time. This prompted the preparation of two formulations D and E according to the definitions in Tables 1 and 3 respectively, wherein Additive 6 consisted of 0.54 of N,N-dimethyl N-benzyl aniline chloride admixed with 1% of the phosphonium salt of structure (d) defined by Example 14 (in both cases). The performance of these mixed quaternary ammonium/phosphonium salt formulations is summarised below.

The experiment was repeated but the aforementioned quaternary ammonium salt was replaced by 1% Aliquat 336 whilst maintaining the same phosphonium salt type and concentration to give formulations F and G (cf Tables 1 and 3 respectively). The performance of these mixed quaternary annomium and phosphonium salt formulations is also summarised below.

| Formulation | 82° C. Stability (Minutes) | Fixture Time (Seconds) | Bond Strength Zero Gap dN/cm$^{-2}$ | 0.5 mm Gap dN/cm$^{-2}$ |
|---|---|---|---|---|
| D | 25 | 930 | 205 | 127 |
| E | 25 | 450 | 199 | 167 |
| F | 25 | 600 | 193 | 184 |
| G | 32 | 1050 | 202 | 133 |

EXAMPLE 17

A model formulation was made up according to Table 3 using pnosphonium salt 14(d) as additive 6 but now at a 0.5% level. Acrylic acid component 8 in Table 3, was replaced by triphenylacetic acid (17(a)), trimethylacetic acid (17(b)), benzoic acid (17(c)), crotonic acid (17(d)). These were compared to an acrylic acid version of the formulation, now having a 0.5% level of 14(d) present (17(e)).

The formulations were tested as specified in Example 2 except that no copper primer treatment was used on the GBMS substrates. Results appear in Table 5.

TABLE 5

| Example # | 82° C. Stability (Minutes) | Fixture Time (No primer) (minutes) | Strength at: Zero Gap (dN/cm$^{-2}$) | 0.5 mm Gap (dN/cm$^{-2}$) |
|---|---|---|---|---|
| 17(a) | 90 | 28 | 130 | 185 |
| 17(b) | 90 | 26 | 180 | 179 |
| 17(c) | 90 | 18 | 140 | 170 |
| 17(d) | 80 | 20 | 143 | 179 |
| 17(e) | Not measured | 35 | 198 | 165 |

The stable formulation corresponding to Example 17(c) in Table 5 exhibits high CTV, and is a particularly good example demonstrating attractive fixture times even in the absence of copper priming treatments.

EXAMPLE 18

Two 2-part adhesive compositions H and I were prepared as described below:

| | Part A (w/w %) | Part B (w/w %) |
|---|---|---|
| Hydroxypropylmethacrylate | 5 | 5 |
| Acrylic Acid | 5 | 5 |
| Stabiliser (1)* | 0.1 | 0.1 |
| Stabiliser (2)** | 0.5 | 0.5 |
| Saccharin | 0.3 | 0.3 |
| Additive | 1.0(A) | 0.5(B) |
| Resin | 35 | 30 |
| Cumene Hydroperoxide | 2 | — |

*as defined in Example 1
**as defined in Example 1.

In both cases the additive in Part B was acetylphenylhydrazine (cf. Rich loc. cit). In formulation (H) the Part A additive was Aliquat 336 and in formulation (I) the Part A additive was the phosphonium salt (d) from Example 14. The performance of the two formulations from tests on unprimed substrates are summarised below. The two components were mixed in equal portions by a mixing applicator before assembly of the lapshear specimens.

| Formulation | 82° C. Stability (Minutes) | | Fixture Time (Minutes) | Bond Strength | |
|---|---|---|---|---|---|
| | | | | Zero Gap dN/cm$^{-2}$ | 0.5 mm Gap |
| | A | B | | | |
| (H) | 25 | 160 | 7.5 | 168 | 83 |
| (I) | 25 | 160 | 7.5 | 164 | 94 |

*no primer

EXAMPLE 19

A model formulation was prepared as specified in Table 3 except additive 6 was replaced by 1.0%, loading of the commercially available cationic photoinitiator known as GE1014 from General Electric which is a complex sulphonium salt of structure V formulated in a 1:1 ratio with solvent propylene carbonate (effective sulphonium salt concentration was thus 0.5% in the formulation).

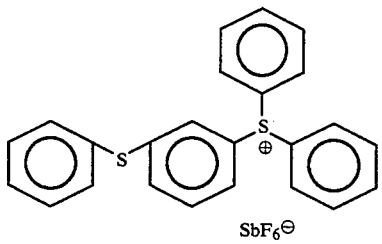

V

CTV performance was recorded as 165 dNcm$^{-2}$ and 60 dNcm$^{-2}$ for zero and 0.5 mm gaps respectively when tested as per Example 1.

It is claimed:

1. A process for sealing or adhering two surfaces having gaps of more than 100 micrometers between the surfaces which comprises:
   (A) applying to at least one of said surfaces an anaerobic compositions comprising:
   (i) a room temperature polymerizable (meth)acrylic ester monomer,
   (ii) a peroxy free radical initiator, and
   (iii) an amount effective as an accelerator of a combination of saccharin and at least one onium salt (other than an iodide), said onium salt being present in an amount of at least about 0.25% by weight of the composition; and
   (B) placing said surfaces in an abutting relationship until the composition has cured through the gaps.

2. A process according to claim 1 wherein the at least one onium salt is a phosphonium salt.

3. A process according to claim 2 wherein the phosphonium salt is of the formula IV

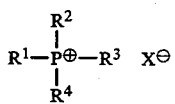

wherein R$^1$, R$^2$, R$^3$ and R$^4$, which may be the stone or different, arc hydrocarbyl, hydrocarbylaryl, aryl or a substituted derivative thereof where the substituted derivatives are substituted with one of halo, nitro or phosphonium groups or substituted or interrupted by one or more heteroatomic keto or ether groups wherein the hetero atom is O, S or N;

X is Cl, Br or F, or a soft anion.

4. A process according to claim 1 wherein the at least one onium salt is a quaternary ammonium salt.

5. A process according to claim 1 wherein the ammonium salt is of the formula II

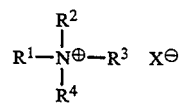

wherein R$^1$, R$^2$, R$^3$, R$^4$ and X are as defined in claim 3.

6. A process according to claim 5 wherein the ammonium salt is of the formula III

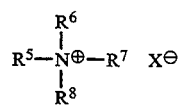

wherein R$^5$, R$^6$, and R$^7$ which may be the same or different are alkyl having at least 8 carbon atoms; R$^8$ is alkyl having 1–5 carbon atoms; and X is Cl, Br or F or a soft anion.

7. A process according to claim 1 which includes priming at least one of the surfaces with a copper based primer mixed with acetyl phenyl hydrazine.

8. An anaerobic adhesive and sealant composition comprising:
   (i) a room temperature polymerizable (meth)acrylic ester monomer,
   (ii) a peroxy free radical initiator, and
   (iii) an amount effective as an accelerator of a combination of saccharin and at least one onium salt (other than an iodide), said onium salt being present in an amount of at least about 0.25% by weight of the composition.

9. A composition according to claim 8 wherein the at least one onium salt is a phosphonium salt.

10. A composition according to claim 9 wherein the phosphonium salt is of the formula IV

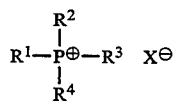

wherein R$^1$, R$^2$, R$^3$ and R$^4$, which may be the same or different, are hydrocarbyl, hydrocarbylaryl, aryl or a substituted derivative thereof where the substituted derivatives are substituted with one of halo, nitro or phosphonium groups or substituted or interrupted by one or more heteroatomic keto or ether groups wherein the hetero atom is O, S or N;

X is Cl, Br or F, or a soft anion.

11. A composition according to claim 10 wherein R$^1$ is: R$^9$—(S)$_n$—(CH$_2$)$_m$— in which R$^9$ is phenyl or substituted phenyl, or C$_1$–C$_5$ alkyl or alkylene, n is 0 or 1 and m is 0 or 1.

12. A composition according to claim 11 wherein R$^2$, R$^3$ R$^4$ are each phenyl or C$_1$–C$_5$ alkyl.

13. A composition according to claim 12 wherein the phosphonium salt is triphenyl phenylthiomethyl phosphonium chloride.

14. A composition according to claim 8 wherein the at least one onium salt is a quaternary ammonium salt.

15. A composition according to claim 14 wherein the ammonium salt is of the formula II

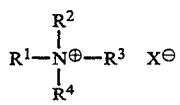

wherein $R^1$, $R^2$, $R^3$, $R^4$ and X are as defined in claim 3.

16. A composition according to claim 15 wherein the ammonium salt is of the formula III

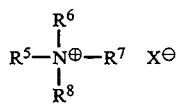

wherein $R^5$, $R^6$, and $R^7$, which may be the same or different are alkyl having at least 8 carbon atoms; $R^8$ is alkyl having 1–5 carbon atoms; and X is Cl, Br or F or a soft anion.

17. A composition according to claim 8 which is free of polymerisable acids such as (meth)acrylic acid.

18. A composition according to claim 17 which contains a non-polymerisable organic acid.

19. A composition according to claim 18 wherein the acid is a weak carboxylic acid such as benzoic acid.

20. A composition according to claim 8 wherein the onium salt is present in an amount of about 0.25% to about 1.5% by weight of the composition.

21. A composition according to claim 8 wherein the at least one onium salt is present in a mixture of an ammonium salt of formula III as defined in claim 16 with one or more other ammonium salts of formula II as defined in claim 15, or a mixture of a phosphonium salt of formula IV as defined in claim 10 with one or more ammonium salts of formula III as defined in claim 16 or one or more other ammonium salts of formula II as defined in claim 15.

22. A composition according to claim 21 wherein the mixture is present in an amount of about 0.25 to about 2% by weight of the composition.

23. A composition according to claim 8 wherein saccharin is present in an amount of about 0.3 to about 5% by weight of the composition.

* * * * *

UNITED STATES PATENT AND TRADEMARK OFFICE
CERTIFICATE OF CORRECTION

PATENT NO. : 5,411,998
DATED : 2 May 1995
INVENTOR(S) : Ciaran B. McArdle

It is certified that error appears in the above-indentified patent and that said Letters Patent is hereby corrected as shown below:

Column 13, line 64, delete "stone" and insert -- same --.
Column 13, line 65, delete "arc" and insert -- are --.

Signed and Sealed this

Eighteenth Day of July, 1995

Attest:

BRUCE LEHMAN

Attesting Officer      Commissioner of Patents and Trademarks